US012633017B2

(12) United States Patent

Herman

(10) Patent No.: US 12,633,017 B2
(45) Date of Patent: May 19, 2026

(54) TRANSFORMING DIGITAL IMAGES

(71) Applicant: Ford Global Technologies, LLC, Dearborn, MI (US)

(72) Inventor: David Michael Herman, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 116 days.

(21) Appl. No.: 18/770,704

(22) Filed: Jul. 12, 2024

(65) Prior Publication Data

US 2026/0017855 A1      Jan. 15, 2026

(51) Int. Cl.
*G09G 5/00*          (2006.01)
*G06T 11/60*         (2006.01)
(Continued)

(52) U.S. Cl.
CPC .............. *G06T 11/60* (2013.01); *G06V 20/56* (2022.01); *G06V 30/1916* (2022.01)

(58) Field of Classification Search
CPC ......... G06T 11/60; G06T 11/40; G06T 19/00; G06T 11/00; G06T 11/20; G06T 11/206; G06T 7/0012; G06T 2207/10081; G06T 2207/30004; G06T 11/203; G06T 2211/441; G06T 2210/28; G06T 11/001; G06T 2200/12; G06T 2200/24; G06F 9/4443; G06F 3/0481; G06F 30/13;
(Continued)

(56) References Cited

U.S. PATENT DOCUMENTS

2005/0132070 A1* 6/2005 Redlich ............... G06F 21/6209
                                                    709/228
2022/0126864 A1* 4/2022 Moustafa .......... B60W 60/0013
(Continued)

FOREIGN PATENT DOCUMENTS

DE      102017215283 A1    2/2019
JP           7354752 B2    10/2023

OTHER PUBLICATIONS

"DALL-E is illiterate with the text it adds in images", Prompting—OpenAI Developer Forum, https://community.openai.com/t/dall-e-is-illiterate-with-the-text-it-adds-in-images/570654/3, downloaded May 2, 2024.
Truly, "5 things AI image generators still struggle with", Digital Trends, May 5, 2023, https://www.digitaltrends.com/computing/5-things-ai-image-generators-still-struggle-with/#:~:text=5%20things%20AI%20image%20generators%20still%20struggle%20with, . . . %206%20AI%20art%20is%20improving%20rapidly%20.
(Continued)

*Primary Examiner* — Gordon G Liu
(74) *Attorney, Agent, or Firm* — Frank Lollo; Brooks Kushman, P.C.

(57)          ABSTRACT

A computer includes a processor and a memory, and the memory stores instructions executable by the processor to receive an original image generated by a camera; execute a visual generative model prompted to generate a synthetic image that is a re-creation of the original image with an intended modification of objects of a preset type in the original image, the synthetic image including an actual modification resulting from the intended modification, the actual modification obscuring an original appearance of the objects of the preset type in the synthetic image; in response to the actual modification achieving the intended modification, delete the synthetic image; and in response to the actual modification not achieving the intended modification, store the synthetic image.

20 Claims, 3 Drawing Sheets

(51) Int. Cl.
  G06V 20/56    (2022.01)
  G06V 30/19    (2022.01)

(58) Field of Classification Search
  CPC ............. G06F 3/04845; G06F 3/04883; G06F
      40/143; G06F 16/54; G06F 16/56; G06F
      16/5838; G06F 16/58; G06F 16/55; G06F
      40/40; G06V 20/20; G06V 10/7753;
      G06V 20/56; G06V 30/1916; G11B
      27/10; H04N 21/47217; G16H 30/20;
      G06N 20/20; G06N 3/045; G06N 3/047;
      G06N 3/08; G06Q 30/0643
  USPC ........................................................ 345/619
  See application file for complete search history.

(56)           References Cited

U.S. PATENT DOCUMENTS

| | | | |
|---|---|---|---|
| 2023/0136710 | A1 | 5/2023 | Guberman et al. |
| 2023/0224542 | A1* | 7/2023 | Panchaksharaiah ......................... H04N 21/44008 725/25 |
| 2024/0073347 | A1* | 2/2024 | Attar .................... G06V 30/133 |
| 2025/0061583 | A1* | 2/2025 | Clever ................. G06V 10/774 |

OTHER PUBLICATIONS

Xiong et al., "Privacy-Preserving Auto-Driving: a GAN-based Approach to Protect Vehicular Camera Data", 2019 IEEE International Conference on Data Mining (ICDM), 2374-8486/19/$31.00 © 2019 IEEE DOI 10.1109/ICDM.2019.00077.

\* cited by examiner

TRANSFORMING DIGITAL IMAGES

BACKGROUND

Digital cameras can detect electromagnetic radiation in some range of wavelengths. For example, cameras may detect visible light, infrared radiation, ultraviolet light, or some range of wavelengths including visible, infrared, and/or ultraviolet light. A camera on a vehicle may be a charge-coupled device (CCD), complementary metal oxide semiconductor (CMOS), etc.

DETAILED DESCRIPTION

Figure 1:
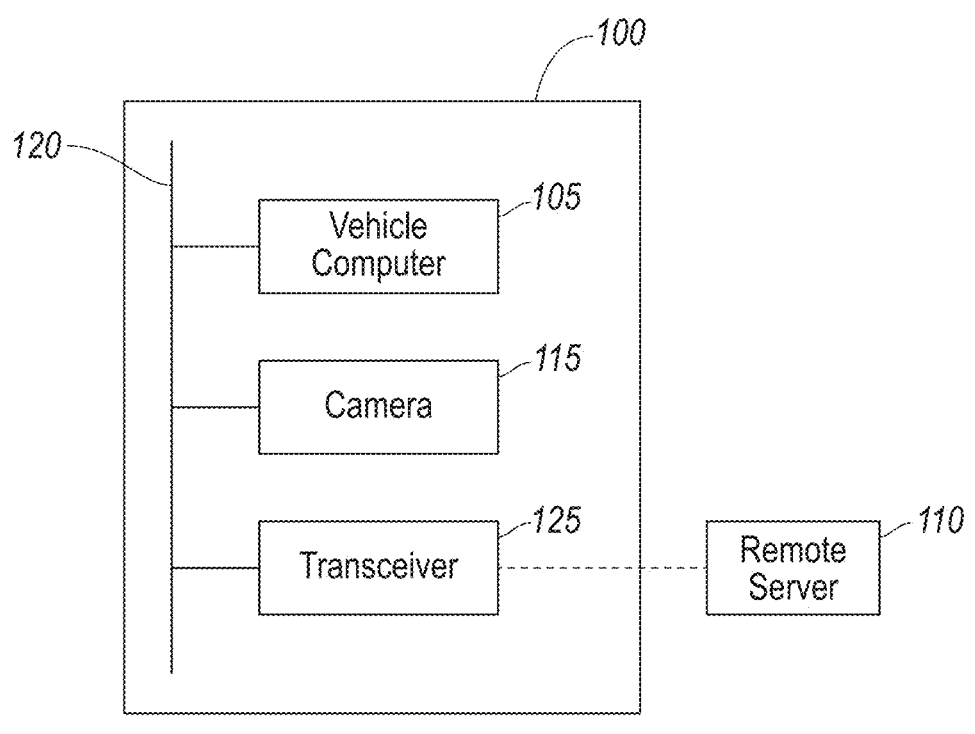
FIG. 1 is a block diagram of an example system including a vehicle in communication with a remote server.

The system and techniques described herein can obscure (e.g., provide anonymization of) objects in digital images. For example, personally identifiable information (PII) in image data can be obscured, that is, rendered undecipherable or uninterpretable. Examples of PII include images of faces, images of signs or text such as license plates, etc. It may also be useful to obscure other object data, such as non-PII data that indicates a location of an image, such as a road sign or a sign identifying a particular business or location that would allow determination of the exact location of a camera.

The techniques herein include to receive an original image generated by a camera and execute a visual generative model prompted to generate a synthetic image that is a re-creation of the original image with an intended modification of objects of a preset (i.e., predetermined) type in the original image. For example, the visual generative model may be prompted to translate all text in the original image from English to French. In this example, the preset type of objects are displays of text, and the intended modification is translation of the text from English to French. The synthetic image includes an actual modification resulting from the intended modification. The intended modification is not what appears in the synthetic image because the actual modification may deviate from the intended modification. The actual modification obscures the original appearance of the objects of the preset type in the synthetic image (e.g., covers or replaces the English text). The techniques further include to, in response to the actual modification achieving the intended modification, delete the synthetic image; and in response to the actual modification not achieving the intended modification, store the synthetic image. To continue the example, if the actual modification achieves the intended modification by being French text, the synthetic image is deleted. If the actual modification does not achieve the intended modification by instead being textlike gibberish, the synthetic image is stored.

In other words, the techniques herein capitalize on what would otherwise be considered poor performance by the visual generative model in order to obscure data in the original image. If the visual generative model performs too well by conventional standards, then someone may be able to discover the data that was intended to be obscured, so the synthetic image is deleted. Continuing the example, if the text is actually translated into French, then someone may be able to translate that French text back into English. That is why a synthetic image that achieves the intended modification is deleted. If the synthetic image does not achieve the intended modification (e.g., by having textlike gibberish instead of French text), then the data has been obscured, and the synthetic image is retained. Moreover, by attempting to re-create the original image with the intended modification rather than completely redacting the data (e.g., by applying black boxes over the objects of the preset type), the synthetic image may be more suitable for various types of analysis post-obscuring (e.g., to assess performance of a vehicle and/or subsystems thereof, such as advanced driver assistance systems (ADAS) of a vehicle). For example, a sign with textlike gibberish may be more useful for training or testing an object recognition program to identify signs than a sign with a box superimposed over the text. Object recognition programs or the like may be included in ADAS features on board a vehicle. The techniques herein can produce digital images with PII or location-specific information obscured that are still useful for such performance assessment.

A computer includes a processor and a memory, and the memory stores instructions executable by the processor to receive an original image generated by a camera; execute a visual generative model prompted to generate a synthetic image that is a re-creation of the original image with an intended modification of objects of a preset type in the original image, the synthetic image including an actual modification resulting from the intended modification, the actual modification obscuring an original appearance of the objects of the preset type in the synthetic image; in response to the actual modification achieving the intended modification, delete the synthetic image; and in response to the actual modification not achieving the intended modification, store the synthetic image.

In an example, the preset type may be displays of text. In a further example, the intended modification may be substituting different text for the text. In a yet further example, the instructions may further include instructions to, in response to the actual modification including recognizable text characters, delete the synthetic image; and, in response to the actual modification lacking recognizable text characters, store the synthetic image.

In an example, the original image may be generated by the camera while the camera is mounted to a vehicle. In a further example, the instructions may further include instructions to, in response to the actual modification not achieving the intended modification, store the synthetic image on a server remote from the vehicle. In a yet further example, the visual generative model may be stored on the server.

In an example, the visual generative model may be a diffusion model.

In an example, the instructions may further include instructions to determine whether the actual modification achieves the intended modification by executing a validation algorithm. In a further example, the validation algorithm may include optical character recognition.

A method includes receiving an original image generated by a camera; executing a visual generative model prompted to generate a synthetic image that is a re-creation of the original image with an intended modification of objects of a preset type in the original image, the synthetic image including an actual modification resulting from the intended modification, the actual modification obscuring an original appearance of the objects of the preset type in the synthetic image; in response to the actual modification achieving the intended modification, deleting the synthetic image; and in response to the actual modification not achieving the intended modification, storing the synthetic image.

In an example, the preset type may be displays of text. In a further example, the intended modification may be substituting different text for the text. In a yet further example, the method may further include, in response to the actual modification including recognizable text characters, deleting the synthetic image; and in response to the actual modification lacking recognizable text characters, storing the synthetic image.

In an example, the original image may be generated by the camera while the camera is mounted to a vehicle. In a further example, the method may further include, in response to the actual modification not achieving the intended modification, storing the synthetic image on a server remote from the vehicle. In a yet further example, the visual generative model may be stored on the server.

In an example, the visual generative model may be a diffusion model.

In an example, the method may further include determining whether the actual modification achieves the intended modification by executing a validation algorithm. In a further example, the validation algorithm may include optical character recognition.

With reference to the Figures, wherein like numerals indicate like parts throughout the several views, a computer 105, 110 includes a processor and a memory, and the memory stores instructions executable by the processor to receive an original image 205 generated by a camera 115; execute a visual generative model 305 prompted to generate a synthetic image 210 that is a re-creation of the original image 205 with an intended modification of objects 220 of a preset type in the original image 205, the synthetic image 210 including an actual modification 215 resulting from the intended modification, the actual modification 215 obscuring an original appearance of the objects 220 of the preset type in the synthetic image 210; in response to the actual modification 215 achieving the intended modification, delete the synthetic image 210; and in response to the actual modification 215 not achieving the intended modification, store the synthetic image 210.

With reference to FIG. 1, the camera 115 may be mounted to a vehicle 100. The vehicle 100 may be any passenger or commercial automobile such as a car, a truck, a sport utility vehicle, a crossover, a van, a minivan, a taxi, a bus, etc. The vehicle 100 includes a vehicle computer 105, a communications network 120, the camera 115, and a transceiver 125.

The computer 105, 110 may be one or a combination of the vehicle computer 105 and a server 110 remote from the vehicle 100.

The vehicle computer 105 is a microprocessor-based computing device such as a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design to describe digital and mixed-signal systems such as FPGA and ASIC. For example, an ASIC is manufactured based on VHDL programming provided pre-manufacturing, whereas logical components inside an FPGA may be configured based on VHDL programming (e.g., stored in a memory electrically connected to the FPGA circuit). The vehicle computer 105 can thus include a processor, a memory, etc. The memory of the vehicle computer 105 can include media for storing instructions executable by the processor as well as for electronically storing data and/or databases, and/or the vehicle computer 105 can include structures such as the foregoing by which programming is provided. The vehicle computer 105 can be multiple computers on board the vehicle 100 coupled together.

The vehicle computer 105 may transmit and receive data through the communications network 120. The communications network 120 may be a controller area network (CAN) bus, Ethernet, WiFi, Local Interconnect Network (LIN), onboard diagnostics connector (OBD-II), and/or any other wired or wireless communications network. The vehicle computer 105 may be communicatively coupled to the camera 115, the transceiver 125, and other components of the vehicle 100 via the communications network 120.

The camera 115 can detect electromagnetic radiation in some range of wavelengths. For example, the camera 115 may detect visible light, infrared radiation, ultraviolet light, or some range of wavelengths including visible, infrared, and/or ultraviolet light. For example, the camera 115 can be a charge-coupled device (CCD), complementary metal oxide semiconductor (CMOS), or any other suitable type. The camera 115 is mounted to the vehicle 100 (e.g., rigidly attached directly or indirectly to a body of the vehicle 100).

The transceiver 125 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 125 may be adapted to communicate with a remote server, that is, a server distinct and spaced from the vehicle 100, such as another vehicle (e.g., V2V communications), an infrastructure component (e.g., V2I communications), a first responder, a mobile device associated with the operator of the vehicle 100, etc. The transceiver 125 is adapted to communicate with the server 110. The transceiver 125 may be one device or may include a separate transmitter and receiver.

The server 110 is remote from the vehicle 100 (i.e., distinct and spaced from the vehicle 100). The server 110 is a microprocessor-based computing device (e.g., a generic computing device including a processor and a memory). The memory of the server 110 can include media for storing instructions executable by the processor as well as for electronically storing data and/or databases, and/or the server 110 can include structures such as the foregoing by which programming is provided. The server 110 can be multiple computers remote from the vehicle 100 that are coupled together.

The techniques described below may be performed by either the vehicle computer 105 or the server 110, unless specifically noted. The term "the computer" will be used to refer to either the vehicle computer 105 or the server 110, or to both the vehicle computer 105 and the server 110. For example, initial steps below may be performed by the vehicle computer 105, and then the remaining steps may be performed by the server 110. After the last step performed by the vehicle computer 105 and before the first step performed by the server 110, the vehicle computer 105 may instruct the transceiver 125 to transmit the data generated through the last step by the vehicle computer 105 to the server 110 for the first step by server 110.

Figure 2:
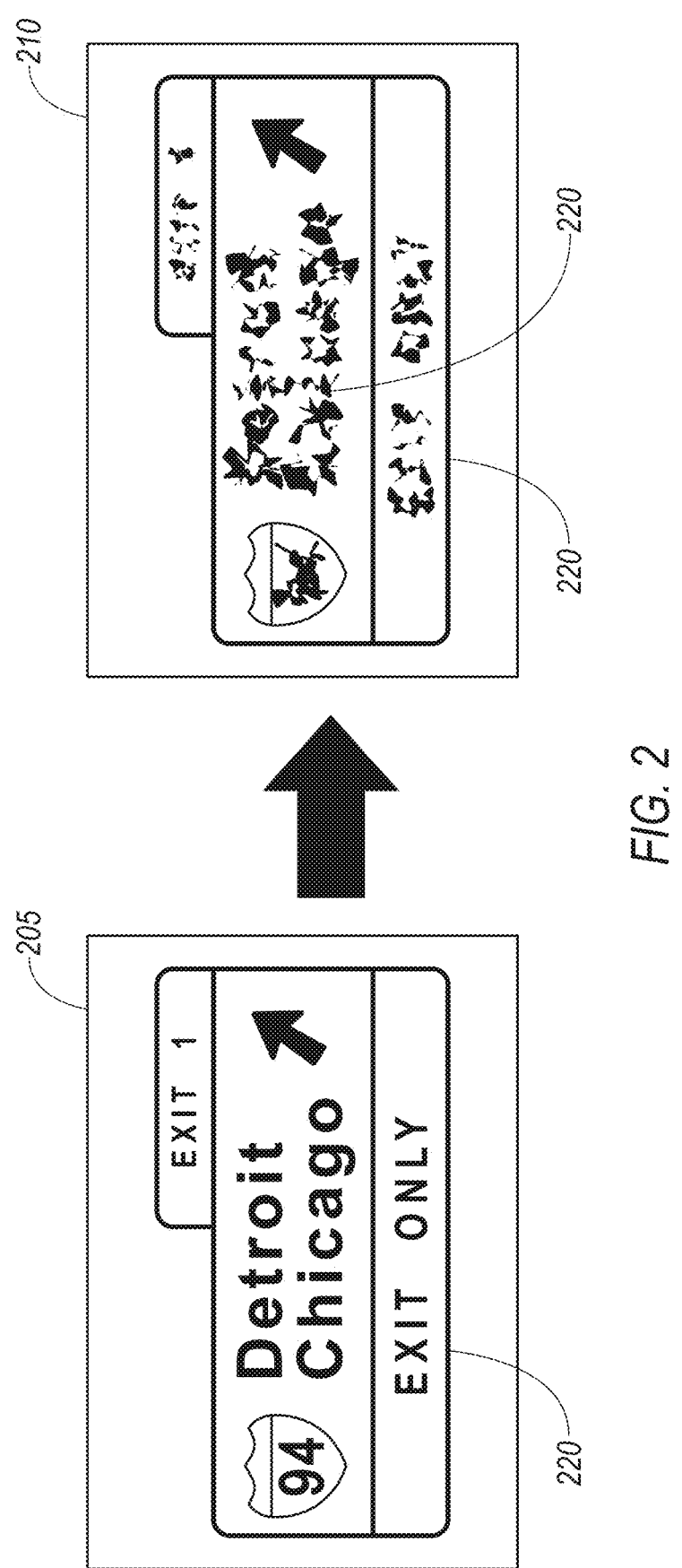
FIG. 2 is an image set including an example original image and an example synthetic image generated from the original image.

With reference to FIG. 2, the computer 105, 110 (e.g., the vehicle computer 105) is programmed to receive an original image 205 generated by the camera 115. Herein an "image" or "image data" means a two-dimensional array or matrix of pixels. The original image 205 is a two-dimensional matrix of pixels. Each pixel has a brightness or color represented as one or more numerical values such as a scalar unitless value of photometric light intensity between 0 (black) and 1 (white), or values for each of red, green, and blue (e.g., each on an 8-bit scale (0 to 255) or a 12- or 16-bit scale). The pixels may be a mix of representations, such as a repeating pattern of scalar values of intensity for three pixels and a fourth pixel with three numerical color values, or some other pattern. Position in an image frame (e.g., position in the field of view of the sensor at the time that the image frame was recorded) can be specified in pixel dimensions or coordinates (e.g., an ordered pair of pixel distances) such as a number of pixels from a top edge and a number of pixels from a left edge of the image frame. The original image 205 may be generated with a global shutter (i.e., all pixels simultaneously) or with a rolling shutter (i.e., different pixels at different times during an interval).

The original image 205 may contain objects 220 of a preset type. For the purposes of this disclosure, a "type" is a classification or category for an object. The preset type may be chosen as a type likely to contain identifying information such as location-specific information or personally identifiable information (PII). For the purposes of this disclosure, location-specific information is defined as a representation of information that permits a location at which an image was generated to be reasonably inferred, and personally identifiable information is defined as a representation of information that permits the identity of an individual to whom the information applies to be reasonably inferred. For example, the preset type may be a display of text such as a sign (e.g., a road sign or a sign identifying a business or storefront). For another example, the preset type may be a face of a person or a license plate on another vehicle.

The synthetic image 210 is artificial, that is, an image that is computer-generated rather than obtained by a camera. The synthetic image 210 may be a two-dimensional matrix of pixels, as described above for the original image 205. The synthetic image 210 may have the same dimensions as the original image 205 (e.g., a same pixel height and pixel width). As will be described below, the synthetic image 210 is a re-creation of the original image 205 and includes an actual modification 215 resulting from an intended modification. Other than any actual modifications 215, the synthetic image 210 may depict the same scene as the original image 205, in other words, the same objects 220 and environmental features shown and arranged in the same way (although deviations may occur at the pixel scale).

For the purposes of this disclosure, an actual modification 215 is defined as an object or characteristic of an object appearing in the synthetic image 210 that is different compared with the object or characteristic in the scene in the original image 205, such as substitution of text or a face, removal or addition of an object, change in color or orientation of an object, etc., and an intended modification is defined as an object or characteristic of an object planned or prompted to appear in the synthetic image 210 that is different compared with the object or characteristic in the scene in the original image 205. The intended modification is not what appears in the synthetic image 210 because the actual modification 215 may deviate from the intended modification. In the example of FIG. 2, the actual modification 215 in the synthetic image 210 is a collection of textlike shapes in the place of English text in the original image 205.

The actual modification 215 may obscure an original appearance of the objects 220 of the preset type in the synthetic image 210. For example, displays of text from the original image 205 may have the text replaced by the actual modification 215, meaning that the displays of text from the original image 205 cannot be read in the synthetic image 210.

Figure 3:
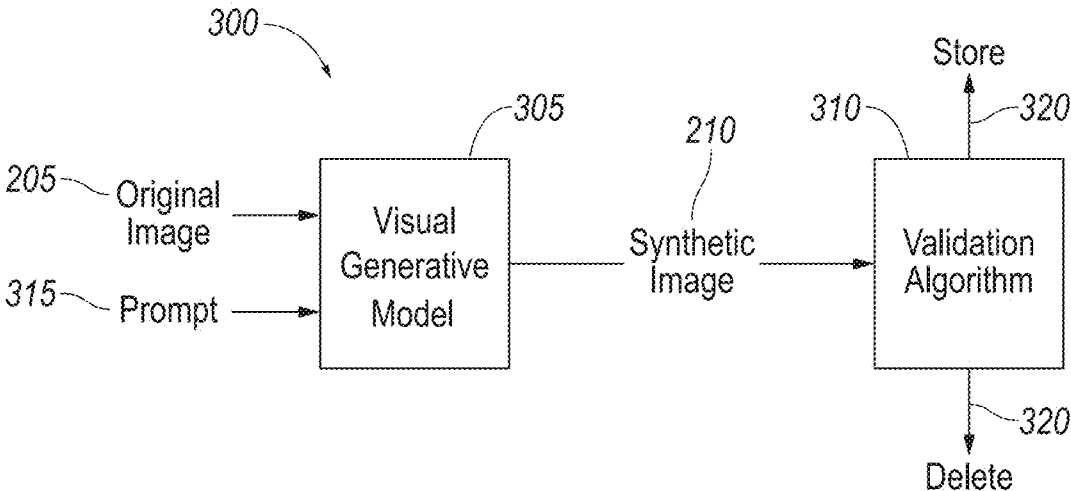
FIG. 3 is an information flow diagram of an example machine-learning architecture for generating the synthetic image.

With reference to FIG. 3, the computer 105, 110 (e.g., the server 110) may be programmed to execute a machine-learning architecture 300. As a general overview, the machine-learning architecture 300 may include the visual generative model 305 and a validation algorithm 310. The visual generative model 305 may receive the original image 205 and a prompt 315 as inputs and may produce the synthetic image 210 as an output. The validation algorithm 310 may receive the synthetic image 210 as an input and output a binary determination 320. The binary determination 320 indicates whether the actual modification 215 achieves the intended modification. The computer 105, 110 stores or deletes the synthetic image 210 depending on the binary determination 320. In response to the binary determination 320 being that the actual modification 215 achieves the intended modification, the computer 105, 110 deletes the synthetic image 210. In response to the binary determination 320 being that the actual modification 215 does not achieve the intended modification, the computer 105, 110 stores the synthetic image 210.

The server 110 may receive the original image 205 from the vehicle computer 105 (e.g., via the transceiver 125). The vehicle computer 105 may instruct the transceiver 125 to transmit the original image 205 to the server 110. The remaining steps below may be performed by the server 110. The machine-learning architecture 300 (e.g., the visual generative model 305 and/or the validation algorithm 310) may be stored on the server 110 (i.e., in the memory of the server 110). The server 110 may have more capacity to execute the machine-learning architecture 300 than the vehicle computer 105.

The computer 105, 110 is programmed to generate the synthetic image 210 that is a re-creation of the original image 205 with the intended modification of the objects 220 of the preset type in the original image 205. The computer 105, 110 re-creates the original image 205 for the portions of the original image 205 that do not contain the objects 220 of the preset type. For the portions of the original image 205 containing the objects 220 of the preset type, the computer 105, 110 attempts to generate the same objects 220 but with the intended modifications.

The computer 105, 110 (e.g., the server 110) generates the synthetic image 210 by executing the visual generative model 305. For the purposes of this disclosure, the term "visual generative model" is used in its machine-learning sense as an artificial intelligence program capable of generating visual data using statistical generative models (i.e., statistical models of a joint probability distribution of observable variable(s) and target variable(s)). For example, the visual generative model 305 may be a diffusion model. For the purposes of this disclosure, the term "diffusion model" is used in its machine-learning sense as a specific class of latent variable generative models. Diffusion models are trained to learn a diffusion process that generates a probability distribution for a given dataset from which new images can be sampled. The probability distribution represents a latent structure of the dataset, and the diffusion model models the way in which data points diffuse through the latent space of the dataset. Diffusion models include a forward process, a reverse process, and a sampling procedure. The forward process includes noise configuration, which perturbs data by adding noise according to a schedule and type of the noise, and a transition chain, which specifies how the data distribution is transformed. The reverse process removes noise from the data distribution. The sampling procedure further denoises by transforming a sample from a terminal distribution of the reverse process.

The visual generative model 305 may be stored on the server 110 (i.e., in the memory of the server 110). The visual generative model 305 may be frozen. For the purposes of this disclosure, the term "frozen" is defined as not receiving updates or new versions. A benefit of keeping the visual generative model 305 frozen is that the visual generative model 305 does not receive updates that help the visual generative model 305 generate actual modifications 215 that do not achieve the intended modifications.

The computer 105, 110 (e.g., the server 110) attempts to apply the intended modification to the objects 220 of the preset type in the original image 205. The intended modification is what is planned or prompted to appear in the synthetic image 210 that is a difference compared with the scene in the original image 205. The intended modification is chosen to replace location-specific information or PII. For example, the intended modification may be substituting different text for the text in the original image 205, such as translating the text in the original image 205 to a different language (e.g., English to French), reorienting the letters of the text to be upside down, reversing the order of the letters of the text, replacing the words with synonyms or antonyms, etc. The intended modification may thus remove location-specific information such as street signs or business names. For another example, the intended modification may be changing facial expressions of faces in the original image 205 (e.g., to be smiling or frowning). The intended modification may thus remove a face that could identify a person in the original image 205.

The intended modification is defined by the prompt 315. The prompt 315 is an instruction or set of instructions for the visual generative model 305. The prompt 315 indicates to re-create the original image 205 with the intended modification of the objects 220 of the preset type in the original image 205. For example, the prompt 315 may indicate to re-create the original image 205 with displays of text translated to a different language, or the prompt 315 may indicate to re-create the original image 205 with faces changed to have different facial expressions. The prompt 315 may be represented in text, according to standards for instructing the visual generative model 305 (e.g., "re-create the attached image [i.e., the original image 205] but with the text in the attached image translated to French"). The prompt 315 or a format for the prompt 315 may be prestored in the memory of the computer 105, 110. The computer 105, 110 may generate the prompt 315 by loading the prompt 315 from memory or loading the format of the prompt 315 from memory with blanks in the format filled in.

The inputs to the visual generative model 305 include the original image 205 and the prompt 315. The computer 105, 110 executes the visual generative model 305 to produce the synthetic image 210 as an output.

The computer 105, 110 (e.g., the server 110) is programmed to determine whether the actual modification 215 in the synthetic image 210 achieves or does not achieve the intended modification. For the purposes of this disclosure, the actual modification 215 achieves the intended modification when a score of the modification is above a threshold, and does not achieve the modification when the score of the modification is below the threshold. The score may be established to measure how well the actual modification 215 recognizably matches the intended modification (i.e., would be seen by a human viewer as being the same thing as the intended modification or as a different thing than the intended modification). For example, in the example of translating text to French mentioned above, the score may be lower when the actual modification 215 includes marks that are not recognizable text characters and higher when the actual modification 215 includes recognizable text characters arranged into words. The actual modification 215 may achieve the intended modification when the score is above the threshold and not achieve the intended modification when the score is below the threshold. The threshold may be chosen to be exceeded when the actual modification 215 contains information that can potentially specify the location of the original image 205.

The computer 105, 110 (e.g., the server 110) may be programmed to determine whether the actual modification 215 achieves the intended modification by executing the validation algorithm 310. The validation algorithm 310 may be or include any suitable algorithm for recognizing the preset type of object 220 (i.e., for recognizing the type of object 220 of the intended modification, i.e., for recognizing the type of object 220 given in the prompt 315). For example, the validation algorithm 310 may include optical character recognition (OCR) or facial recognition, as are known. For the example of OCR, the computer 105, 110 may determine that the actual modification 215 achieves the intended modification in response to the actual modification 215 including recognizable text characters, and the computer 105, 110 may determine that the actual modification 215 does not achieve the intended modification in response to the actual modification 215 lacking recognizable text characters. The validation algorithm 310 may further generate the score indicating how closely the actual modification 215 matches the intended modification. For the example of OCR, the score may be, for example, a proportion of the actual modification filled by text recognizable to the OCR.

The validation algorithm 310 may include further assessments of the synthetic image 210, such as to test whether synthetic image 210 is a re-creation of the original image 205. For example, the validation algorithm 310 may include determining whether a pixel similarity between the synthetic image 210 and the original image 205 is above a threshold (or a pixel difference is below a threshold), indicating that the synthetic image 210 is a re-creation of the original image 205. The threshold may be chosen to encompass the actual modifications 215 but not other significant changes. For another example, the validation algorithm 310 may include determining whether changes to a histogram of (for example) colors between the synthetic image 210 and the original image 205 are within a threshold, indicating that the synthetic image 210 is a re-creation of the original image 205. The threshold may be chosen to encompass the actual modifications 215 but not other significant changes. For another example, the validation algorithm 310 may include executing an object recognition algorithm on the original image 205 for the preset types of objects 220, and determining whether the pixel locations of the actual modifications 215 match the pixel locations of the objects 220 of the preset type (e.g., whether the pixel locations of the actual modifications 215 are within bounding boxes outputted by the object recognition algorithm), indicating that the synthetic image 210 is a re-creation of the original image 205. In response to one or more of these tests indicating that the synthetic image 210 is not a re-creation of the original image 205, the validation algorithm 310 may switch the binary determination 320 to delete the synthetic image 210. In response to all the tests indicating that the synthetic image 210 is a re-creation of the original image 205, the validation algorithm 310 may leave the binary determination 320 as is, whether store or delete.

The computer 105, 110 (e.g., the server 110) is programmed to, in response to the actual modification 215 not achieving the intended modification, store the synthetic image 210. For example, the computer 105, 110 may store the synthetic image 210 on the server 110, which is remote from the vehicle 100. The computer 105, 110 may store the synthetic image 210 in a set of training data or testing data used for training a machine-learning program (e.g., an object recognition program or the like). Training data is used during a learning process that sets parameters of the machine-learning program, and testing data is used for assessing the performance of the machine-learning program after the training. The synthetic image 210 may be used for, as one example, training machine-learning models for performing tasks on board the vehicle 100. The use of the actual modification 215 (e.g., rather than full redaction) can make the synthetic image 210 more suitable for this purpose.

The computer 105, 110 (e.g., the server 110) is programmed to, in response to the actual modification 215 achieving the intended modification, delete the synthetic image 210. The computer 105, 110 may delete all copies of the synthetic image 210, meaning that the synthetic image 210 is no longer available to anyone.

The vehicle computer 105 may delete the original image 205 after transmitting the original image 205 to the server 110, and the server 110 may delete the original image 205 after generating the synthetic image 210.

Figure 4:
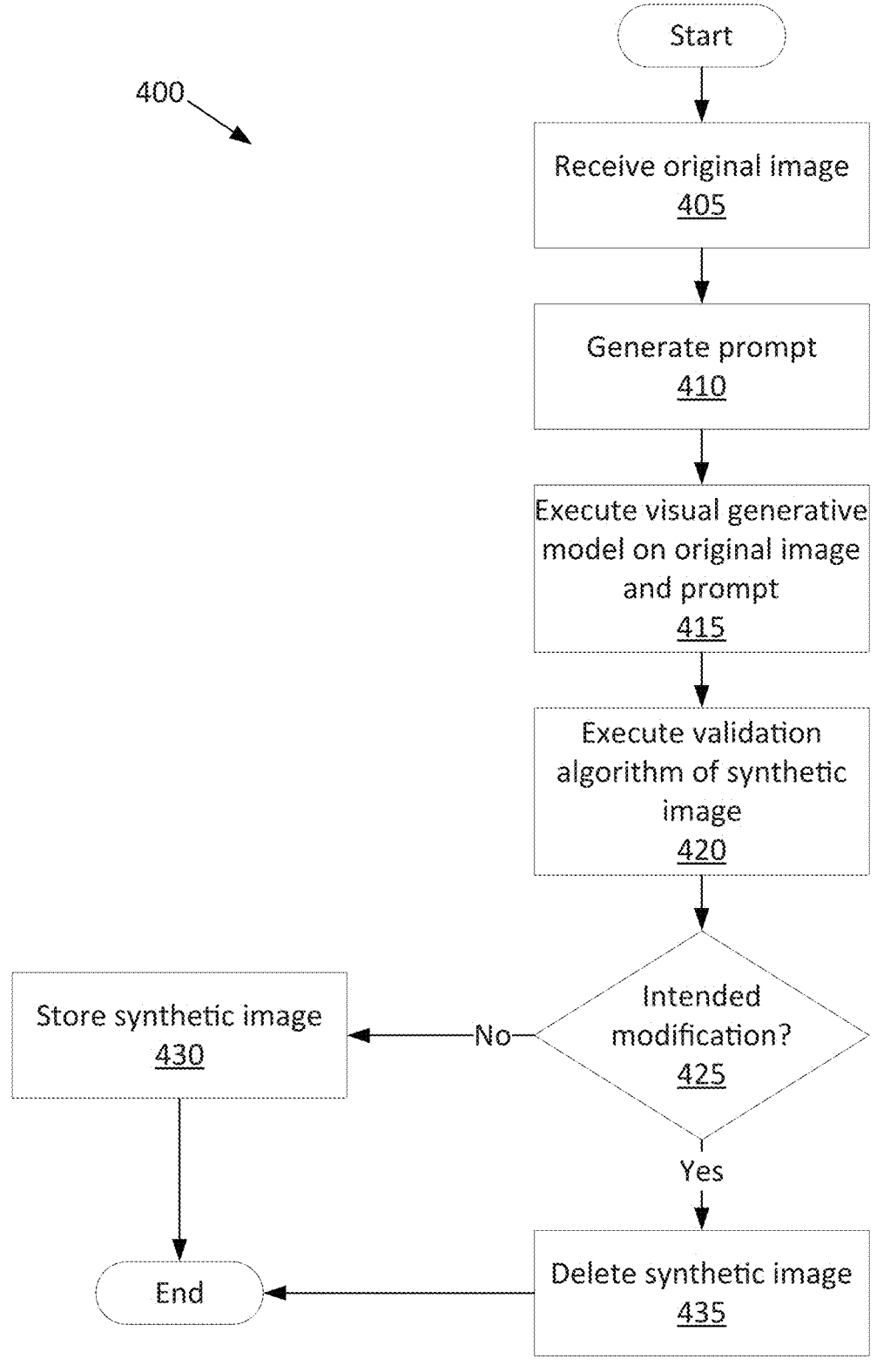
FIG. 4 is a flowchart of an example process for generating the synthetic image.

FIG. 4 is a flowchart illustrating an example process 400 for generating the synthetic image 210. The memory of the computer 105, 110 (e.g., the vehicle computer 105 and/or the server 110) stores executable instructions for performing the steps of the process 400 and/or programming can be implemented in structures such as mentioned above. As a general overview of the process 400, the computer 105, 110 receives the original image 205 generated by the camera 115, generates a prompt 315 for the intended modification, executes the visual generative model 305 to generate the synthetic image 210, and executes the validation algorithm 310. The computer 105, 110 stores the synthetic image 210 in response to the actual modification 215 not achieving the intended modification, and the computer 105, 110 deletes the synthetic image 210 in response to the actual modification 215 achieving the intended modification.

The process 400 begins in a block 405, in which the computer 105, 110 receives the original image 205 generated by the camera 115, as described above. The vehicle computer 105 receives the original image 205 from the camera 115 via the communications network 120, and/or the server 110 receives the original image 205 from the vehicle computer 105 via the transceiver 125.

Next, in a block 410, the computer 105, 110 generates the prompt 315 (e.g., by loading a prestored prompt 315 or format) to re-create the original image 205 with the intended modification of the objects 220 of the preset type in the original image 205, as described above.

Next, in a block 415, the computer 105, 110 executes the visual generative model 305 by inputting the original image 205 from the block 405 and the prompt 315 from the block 410 into the visual generative model 305, as described above.

Next, in a block 420, the computer 105, 110 executes the validation algorithm 310 by inputting the synthetic image 210 from the block 415 into the validation algorithm 310, as described above.

Next, in a decision block 425, the computer 105, 110 determines whether the actual modification 215 achieves the intended modification according to the binary determination 320 outputted by the validation algorithm 310 from the block 420. In response to the actual modification 215 not achieving the intended modification, the process 400 proceeds to a block 430. In response to the actual modification 215 achieving the intended modification, the process 400 proceeds to a block 435.

In the block 430, the computer 105, 110 stores the synthetic image 210 (e.g., in a set of training data or testing data), as described above. After the block 430, the process 400 ends.

In the block 435, the computer 105, 110 deletes the synthetic image 210, as described above. After the block 435, the process 400 ends.

In general, the computing systems and/or devices described may employ any of a number of computer operating systems, including, but by no means limited to, versions and/or varieties of the Ford Sync® application, App-Link/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions (e.g., from a memory, a computer readable medium, etc.) and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted.

The disclosure has been described in an illustrative manner, and it is to be understood that the terminology which has been used is intended to be in the nature of words of description rather than of limitation. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:
   receive an original image generated by a camera;
   execute a visual generative model prompted to generate a synthetic image that is a recreation of the original image with an intended modification of objects of a preset type in the original image, the synthetic image including an actual modification resulting from the intended modification, the actual modification obscuring an original appearance of the objects of the preset type in the synthetic image;
   in response to the actual modification achieving the intended modification as a result of generating the synthetic image, delete the synthetic image; and
   in response to the actual modification not achieving the intended modification as a result of generating the synthetic image, store the synthetic image.

2. The computer of claim 1, wherein the preset type is displays of text.

3. The computer of claim 2, wherein the intended modification is substituting different text for the text.

4. The computer of claim 3, wherein the instructions further include instructions to:
   in response to the actual modification including recognizable text characters, delete the synthetic image; and
   in response to the actual modification lacking recognizable text characters, store the synthetic image.

5. The computer of claim 1, wherein the original image is generated by the camera while the camera is mounted to a vehicle.

6. The computer of claim 5, wherein the instructions further include instructions to, in response to the actual modification not achieving the intended modification, store the synthetic image on a server remote from the vehicle.

7. The computer of claim 6, wherein the visual generative model is stored on the server.

8. The computer of claim 1, wherein the visual generative model is a diffusion model.

9. The computer of claim 1, wherein the instructions further include instructions to determine whether the actual modification achieves the intended modification by executing a validation algorithm.

10. The computer of claim 9, wherein the validation algorithm includes optical character recognition.

11. A method comprising:
   receiving an original image generated by a camera;
   executing a visual generative model prompted to generate a synthetic image that is a recreation of the original image with an intended modification of objects of a preset type in the original image, the synthetic image including an actual modification resulting from the intended modification, the actual modification obscuring an original appearance of the objects of the preset type in the synthetic image;
   in response to the actual modification achieving the intended modification as a result of generating the synthetic image, deleting the synthetic image; and
   in response to the actual modification not achieving the intended modification as a result of generating the synthetic image, storing the synthetic image.

12. The method of claim 11, wherein the preset type is displays of text.

13. The method of claim 12, wherein the intended modification is substituting different text for the text.

14. The method of claim 13, further comprising:
   in response to the actual modification including recognizable text characters, deleting the synthetic image; and
   in response to the actual modification lacking recognizable text characters, storing the synthetic image.

15. The method of claim 11, wherein the original image is generated by the camera while the camera is mounted to a vehicle.

16. The method of claim 15, further comprising, in response to the actual modification not achieving the intended modification, storing the synthetic image on a server remote from the vehicle.

17. The method of claim 16, wherein the visual generative model is stored on the server.

18. The method of claim 11, wherein the visual generative model is a diffusion model.

19. The method of claim 11, further comprising determining whether the actual modification achieves the intended modification by executing a validation algorithm.

20. The method of claim 19, wherein the validation algorithm includes optical character recognition.

* * * * *